US008762274B2

(12) United States Patent
Bosch et al.

(10) Patent No.: US 8,762,274 B2
(45) Date of Patent: Jun. 24, 2014

(54) REMOTE CURRENCY DISPENSATION SYSTEMS AND METHODS

(71) Applicant: Peregrin Technologies, Inc., Portland, OR (US)

(72) Inventors: Samuel H. Bosch, Portland, OR (US); Jonathan H. Bosch, Pitman, NJ (US)

(73) Assignee: Peregrin Technologies, Inc., Portland, OR (US)

( * ) Notice: Subject to any disclaimer, the term of this patent is extended or adjusted under 35 U.S.C. 154(b) by 0 days.

(21) Appl. No.: 13/710,414

(22) Filed: Dec. 10, 2012

(65) Prior Publication Data

US 2013/0151407 A1     Jun. 13, 2013

Related U.S. Application Data

(62) Division of application No. 12/864,851, filed as application No. PCT/US2009/032492 on Jan. 29, 2009, now Pat. No. 8,332,321.

(60) Provisional application No. 61/025,776, filed on Feb. 2, 2008.

(51) Int. Cl.
*G06Q 40/00*       (2012.01)

(52) U.S. Cl.
USPC ............................................. 705/43; 705/35

(58) Field of Classification Search
USPC ......................................................... 705/35
See application file for complete search history.

(56) References Cited

U.S. PATENT DOCUMENTS

| | | |
|---|---|---|
| 3,941,977 A | 3/1976 | Voss et al. |
| 3,949,364 A | 4/1976 | Clark et al. |
| 4,134,537 A | 1/1979 | Glaser et al. |
| 4,197,986 A | 4/1980 | Nagata |
| 4,294,380 A | 10/1981 | Rankin |
| 4,650,977 A | 3/1987 | Couch |

(Continued)

FOREIGN PATENT DOCUMENTS

| | | |
|---|---|---|
| EP | 0242624 | 10/1987 |
| EP | 0580297 A2 | 7/1997 |

(Continued)

OTHER PUBLICATIONS

Mastercard Advisors, Segmented Loyalty Programs Offer Issuers Highly Targeted Promotions to Drive Cardholder Usage, Apr. 23, 2007, 2 pages.

(Continued)

*Primary Examiner* — William Rankins
(74) *Attorney, Agent, or Firm* — Stoel Rives LLP

(57) ABSTRACT

A currency dispense and control system (CDCS) for securely dispensing paper currency in multiple modes: (1) an ATM system and (2) a currency control system that allows a merchant or merchant-approved employee to withdraw cash from the CDCS independent of a standard ATM electronic fund transfer (EFT) network. The CDCS may be on-site and implemented using standard ATM hardware or may be located remotely. The CDCS may also include one or more of the following functionalities: a duress dispensation system that allows the CDCS to activate an alarm and/or otherwise communicate with local police or security services during a robbery, a time-release system that effects a time-delayed dispensation functionality, and a user identification and authentication system for authenticating a user identity and determining eligibility of the user to access the currency control system.

16 Claims, 11 Drawing Sheets

(56) References Cited

U.S. PATENT DOCUMENTS

| | | | |
|---|---|---|---|
| 4,650,978 A | 3/1987 | Hudson et al. | |
| 4,660,168 A | 4/1987 | Grant et al. | |
| 4,894,784 A | 1/1990 | Smith | |
| 4,928,001 A | 5/1990 | Masada | |
| 4,965,568 A * | 10/1990 | Atalla et al. | 340/5.85 |
| 5,220,157 A | 6/1993 | Martin et al. | |
| 5,340,967 A | 8/1994 | Martin et al. | |
| 5,546,523 A | 8/1996 | Gatto | |
| 5,650,604 A | 7/1997 | Marcous et al. | |
| 5,773,804 A | 6/1998 | Baik | |
| 5,838,773 A | 11/1998 | Eisner et al. | |
| 5,883,371 A | 3/1999 | Meeker | |
| 5,897,625 A | 4/1999 | Gustin et al. | |
| 5,937,396 A | 8/1999 | Konya | |
| 6,000,555 A | 12/1999 | Anma | |
| 6,009,408 A | 12/1999 | Buchanan | |
| 6,081,792 A | 6/2000 | Cucinotti et al. | |
| 6,176,423 B1 | 1/2001 | Egami | |
| 6,196,456 B1 | 3/2001 | Taylor | |
| 6,213,341 B1 | 4/2001 | Keith et al. | |
| 6,285,988 B1 | 9/2001 | Nogami | |
| 6,304,860 B1 | 10/2001 | Martin, Jr. et al. | |
| 6,442,690 B1 | 8/2002 | Howard et al. | |
| 6,450,407 B1 | 9/2002 | Freeman et al. | |
| 6,502,746 B1 | 1/2003 | Do et al. | |
| 6,508,397 B1 | 1/2003 | Do | |
| 6,523,743 B1 | 2/2003 | Patterson et al. | |
| 6,540,136 B1 | 4/2003 | Ross | |
| 6,754,822 B1 | 6/2004 | Zhao | |
| 6,895,386 B1 | 5/2005 | Bachman et al. | |
| 6,942,569 B2 | 9/2005 | Petracca | |
| 7,379,896 B1 | 5/2008 | Meek et al. | |
| 7,726,557 B2 | 6/2010 | Bosch et al. | |
| 7,753,259 B1 | 7/2010 | Taylor et al. | |
| 2002/0032655 A1 | 3/2002 | Antonin et al. | |
| 2002/0036159 A1 | 3/2002 | Graef et al. | |
| 2002/0077889 A1 | 6/2002 | Kolls | |
| 2002/0091562 A1 | 7/2002 | Siegel et al. | |
| 2002/0122568 A1 | 9/2002 | Zhao | |
| 2002/0138433 A1 | 9/2002 | Black et al. | |
| 2002/0138446 A1 | 9/2002 | Antonin et al. | |
| 2002/0143612 A1 | 10/2002 | Barik et al. | |
| 2003/0004876 A1 * | 1/2003 | Jacobson | 705/41 |
| 2003/0025617 A1 | 2/2003 | Kunigkeit et al. | |
| 2003/0040959 A1 | 2/2003 | Fei et al. | |
| 2003/0065563 A1 | 4/2003 | Elliott et al. | |
| 2003/0141362 A1 * | 7/2003 | Brown et al. | 235/380 |
| 2003/0141372 A1 | 7/2003 | Brown et al. | |
| 2003/0163417 A1 | 8/2003 | Cachey et al. | |
| 2004/0133495 A1 | 7/2004 | Bosch et al. | |
| 2005/0085931 A1 | 4/2005 | Willeby | |
| 2005/0273387 A1 | 12/2005 | Previdi | |
| 2005/0289056 A1 | 12/2005 | Guinn | |
| 2006/0016884 A1 * | 1/2006 | Block et al. | 235/381 |
| 2007/0131757 A1 * | 6/2007 | Hamilton et al. | 235/379 |
| 2007/0181674 A1 | 8/2007 | Taylor et al. | |
| 2008/0103905 A1 | 5/2008 | Nixon-Lane | |
| 2008/0147496 A1 | 6/2008 | Bal et al. | |
| 2008/0275768 A1 | 11/2008 | Berman et al. | |
| 2009/0287562 A1 | 11/2009 | Bosch et al. | |
| 2010/0030687 A1 * | 2/2010 | Panthaki et al. | 705/43 |
| 2010/0180018 A1 * | 7/2010 | Cacheria et al. | 709/220 |
| 2010/0241562 A1 | 9/2010 | Bosch et al. | |

FOREIGN PATENT DOCUMENTS

| | | |
|---|---|---|
| EP | 0822525 A2 | 2/1998 |
| FR | 2350652 | 12/1977 |
| WO | WO 94/11836 | 5/1994 |

OTHER PUBLICATIONS

ATM marketplace.com, ATM Rewards, http://www.atmmarketplace.com/article_printable.php?id=1837&page=1, May 9, 2001, 4 pages.

International Searching Authority, Written Opinion and International Search Report, International PCT Application No. PCT/US09/32492, dated Aug. 28, 2009, 9 pages.

European Patent Office, Supplementary European Search Report, European Patent Application No. EP 03814137, dated Jul. 6, 2006, 3 pages.

International Searching Authority, International Search Report, International PCT Application No. PCT/US03/40288, dated Apr. 28, 2004, 4 pages.

Tidel Engineering, L.P. Product Information, http://www.Tidel.com/products.asp, 2002, visited Dec. 9, 2002, 3 pages.

NKL, Presenting Autobank and Intellisafe by NKL (a product brochure), 2001, 16 pages.

Triton Systems, Inc., Triton 9700 Product Brochure, 2001, 2 pages.

Armor Safe Technologies, Products, http://www.armorsafe.com/products/cs7000.html, 2000, visited Dec. 9, 2002, 4 pages.

* cited by examiner

REMOTE CURRENCY DISPENSATION SYSTEMS AND METHODS

RELATED APPLICATIONS

This application is a divisional patent application of and claims the benefit under 35 U.S.C. 120 of U.S. patent application Ser. No. 12/864,851, filed Jul. 27, 2010, now U.S. Pat. No. 8,332,321; which is a national stage application under 35 U.S.C. 371 of International Application No. PCT/US2009/032492, filed Jan. 29, 2009; which claims the benefit under 35 U.S.C. §119(e) of U.S. Provisional Application No. 61/025,776, filed Feb. 2, 2008; each of which is hereby incorporated by reference in its entirety.

TECHNICAL FIELD

The field of this disclosure relates to a currency dispense and control system (CDCS) that effects dispensation of currency independently of an electronic fund transfer (EFT) network.

BACKGROUND INFORMATION

Automated teller machines (ATMs) have traditionally allowed customers of a financial institution to withdraw money from or deposit money into the customer's account with the financial institution. For example, to withdraw money from the customer's account, the customer inserts an ATM card into the ATM so that encoded data on a magnetic stripe of the ATM card, such as the customer's account information, can be read by the ATM. The ATM then prompts the customer to enter a personal identification number (PIN) and the amount of money to withdraw, and sends a request to the customer's financial institution via an electronic fund transfer (EFT) network to get authorization for the withdrawal. If the account information and PIN matches account and PIN data at the customer's financial institution and there are sufficient funds in the customer's account, the financial institution will authorize the request and send a message to the ATM via the EFT network to dispense the money. ATM transactions that depend on an EFT network may be expensive as a result of usage fees (e.g., fees charged each time the EFT network is accessed or fees associated with maintaining a leased line connection). Further, an EFT network may become unavailable due to power disruption, inclement weather, or inoperable hardware.

U.S. Patent Application Publication No. 2004/0133495 discloses a currency dispense and control system (CDCS) that includes an ATM system that effects dispensation of currency using an EFT network and a currency control system that effects dispensation of currency independently of an EFT network. The CDCS is especially well suited for providing merchants, such as convenience stores, grocery stores, and restaurants, with the ability to withdraw cash from the CDCS independently of an EFT network (e.g., to pay out winnings from electronic gaming stations, such as video poker). Implementing CDCS functionality using existing ATM hardware may require writing new code for each make and model of ATM and installing the new code on multiple ATMs. Thus, the present inventors have recognized a potential advantage for a centralized CDCS that also effects dispensation of currency independently of an EFT network.

DETAILED DESCRIPTION

With reference to the above-listed drawings, this section describes particular embodiments and their detailed construction and operation. The embodiments described herein are set forth by way of illustration only. Those skilled in the art will recognize in light of the teachings herein that variations can be made to the embodiments described herein and that other embodiments are possible. No attempt is made to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

According to one embodiment, the CDCS includes an automated teller machine (ATM) system and a controlled currency control system that securely dispenses cash and that operates independently of electronic fund transfer (EFT) networks, such as interbank networks or other proprietary networks that transmit financial information and to which access is restricted. The currency control system may also receive currency for immediate storage or disbursement through the ATM or currency control portions of the CDCS.

The currency control system may also include a user identification and authentication system for authenticating a user's identity and determining eligibility of the user to access the currency control system. One preferred implementation of the user identification and authorization system requires entry of a user identifier and a personal identification code that are compared with a master list defining a set of users entitled to access the currency control system. The currency control system may also include a report-generating system that preferably prepares, records, and prints a list of dispensations of on-site currency.

The currency control system may also generate a timed delay between dispenses; the timed delay may be generated either before or after each dispensation. The CDCS may also include a dispensation timing system that regulates the timing of each dispensation such that a dispensation may be effected only during a specified period of time, thereby preventing dispenses of currency outside of the specified period of time. For example, the specified time periods may include an establishment's hours of operation and the hourly intervals of each shift.

The CDCS may also include theft-deterrent functionalities. By way of example, theft-deterrent functionalities include (1) the currency control system having a configurable maximum single dispensation amount and (2) the currency control system including a duress dispensation system that activates an alarm and/or otherwise communicates with local police or security services in the event of a robbery.

Figure 1:
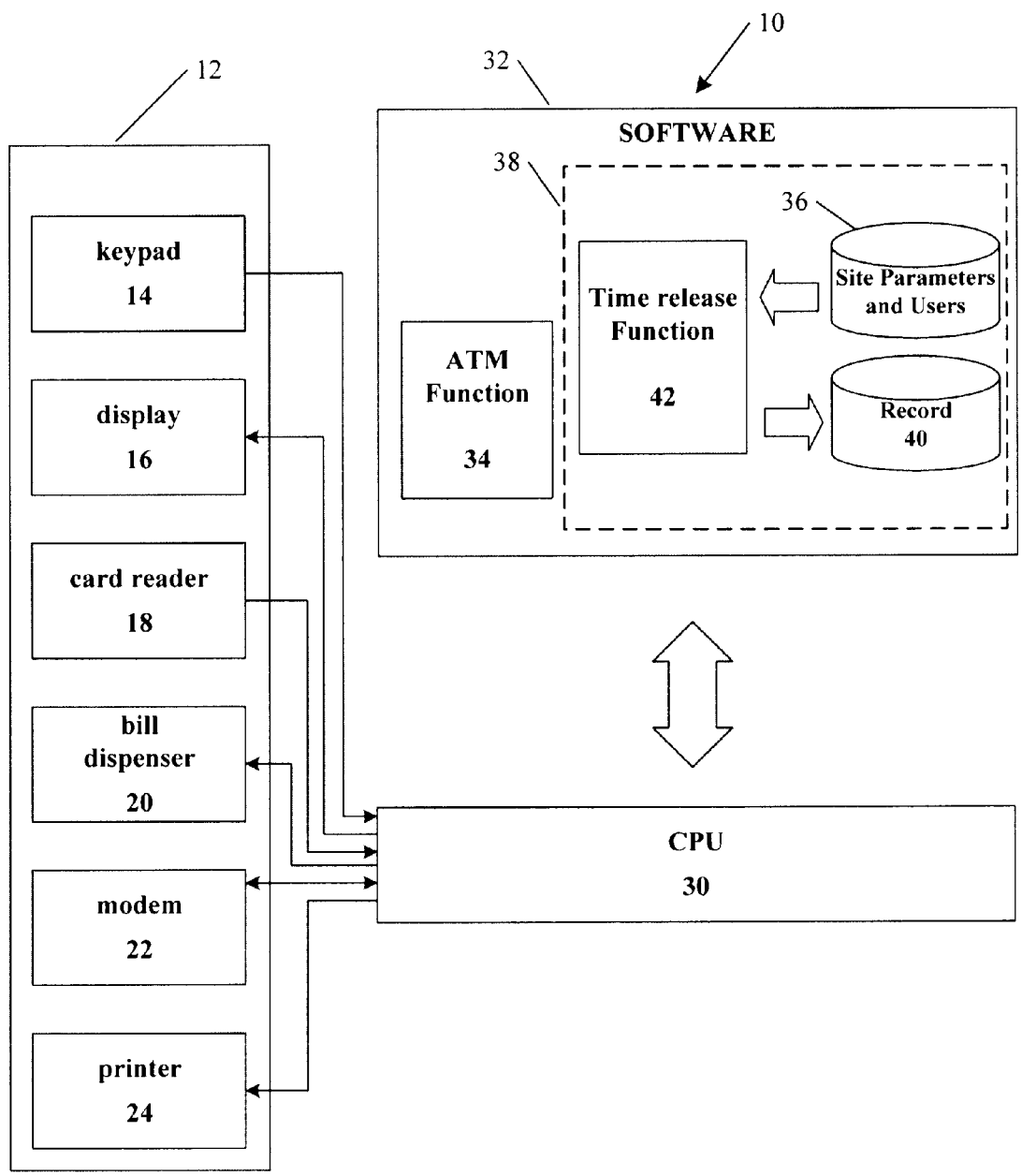
FIG. 1 is a block diagram showing the functional portions of a CDCS and the interaction between the ATM system and the currency control system, according to one embodiment.

FIG. 1 illustrates a CDCS 10 capable of operating in an automated teller machine (ATM) mode in which the CDCS 10 performs traditional ATM transactions and a currency control mode in which the CDCS 10 performs merchant-initiated currency control transactions (e.g., time-release safe transactions). To minimize the cost of the CDCS and the floor space occupied by the CDCS, both the ATM and the merchant-initiated currency control transactions are preferably performed by standard ATM hardware whose software has been configured to effect both transactions. However, in an alternative implementation, the currency control system may be housed in a device that is located peripherally to the portion of the CDCS housing the ATM system (not shown). In addition, the currency control system may be located remotely, such being implemented in transaction processor 508 (see FIG. 5).

Standard ATM hardware includes a collection of input and output devices 12 that accept, transmit, and respond to requests for cash withdrawal. Input and output devices 12 include a keypad 14 into which the user or customer enters his or her identifying information and cash withdrawal request information, a display 16 that effects communication between the user or customer and the ATM system, a card reader 18 that recognizes a card having a unique magnetic stripe and reads the information contained on the magnetic stripe, a bill dispenser 20 that dispenses currency to the user or customer, a modem 22 that is connected to an EFT network and that communicates with the lending institution associated with the ATM system, and a printer 24 that prints receipts for the users or customers of the ATM system and summary reports for the owner of the establishment at which the CDCS is housed. The modem 22 may connect to the EFT network via a leased line or a plain old telephone service (POTS) line. In addition, the connection to the EFT network may be via a wired or wireless network, such as a local area network (LAN) or wide area network (WAN), such as the internet.

Input and output devices 12 interact with a CPU 30, which interacts with a software system 32. Software system 32 is designed to include ATM transactional software 34 and merchant-initiated currency control transactional software 38. Several interactions between ATM transactional software 34 and merchant-initiated currency control transactional software 38 are shown in the flow diagrams of FIGS. 2 and 3.

Standard ATM operation is well known to those skilled in the art. However, a brief summary of the operational parameters in effect when CDCS 10 is operating in standard ATM mode is as follows. As directed by display 16, a customer places his or her bank-issued ATM card into card reader 18 and enters a personal identification number (PIN) using keypad 14. Once the CPU has verified the identity of the user using the EFT network accessed through modem 22, the customer may access funds being stored in the customer's bank account. The customer may, at his or her option, deposit money into the customer's bank account, withdraw money from the customer's bank account, or both. Withdrawn money is immediately dispensed by bill dispenser 20 as cash. The customer may also check an account balance or transfer funds between accounts.

When CDCS 10 is operating in currency control mode, a merchant or merchant-approved employee can withdraw cash from CDCS 10 both independent of an EFT network and without checking an account balance stored on the user's card. A brief summary of an exemplary series of operational parameters in effect when CDCS 10 is operating in currency control mode is as follows. The merchant or merchant-approved employee inserts or swipes a magnetic stripe card into or through card reader 18. Following a prompt that appears on display 16, the merchant or merchant-approved employee types into keyboard 14 a PIN, which is preferably a numeric code between four and six digits in length. Software 32 includes a user identification and authentication system for authenticating the user's identity and determining eligibility of the user to access the currency control system. This portion of software 32 processes the data presented by the magnetic stripe card and the PIN and recognizes that the user is not requesting use of the ATM system. The user identification and authentication system instructs software 32 not to use modem 22 to call a bank via the EFT network. By way of display 16, the merchant or merchant-approved employee is asked to use keypad 14 to enter a desired withdrawal amount. The data on the magnetic-stripe card and the PIN are compared with data tables stored in software 32 to verify that the merchant or merchant-approved employee is a valid currency control system user. In other words, when CDCS 10 is operating in an on-site currency control mode, CDCS 10 does not transmit a request to dispense currency and instead determines whether to dispense the requested withdrawal amount using a currency control system, such as currency control system 38. Following a sequence of software processing steps that are described in greater detail below, the requested withdrawal amount is dispensed by bill dispenser 20 in the form of cash.

In one preferred implementation of CDCS 10, a recordation system 40 records the amount of money that was dispensed, the identification information relating to the merchant or merchant-approved user that requested the money, and the date and time of the dispensation. Optionally, some or all of this data can be used by a report-generating system within software 32 to generate shift and day reports that can be printed using printer 24. For example, CDCS 10 can generate reports listing the number of ATM or currency control system withdrawals in a given time period and the amount of money withdrawn or deposited for each ATM transaction or currency control transaction. Further, CDCS 10 could generate separate reports for employees and more detailed reports for the merchant or the owner of CDCS 10.

In another preferred implementation, CDCS 10 includes a dispensation control system that compares the desired withdrawal amount entered by the merchant or merchant-approved user with parameter data 36 stored in software 32. If the desired withdrawal amount exceeds the maximum withdrawal amount defined as a parameter 36 of software 32, the operating sequence is terminated and the user may preferably be asked to enter an alternative desired withdrawal amount. If all of three separately entered desired withdrawal amounts exceed the maximum withdrawal amount, the user is informed by an error message that appears on display 16 that the transaction has been terminated. In instances in which the user's magnetic stripe card was inserted into CDCS 10, it is preferably expelled and returned to the user; alternatively, the magnetic stripe card may be confiscated by CDCS 10.

Figure 4:
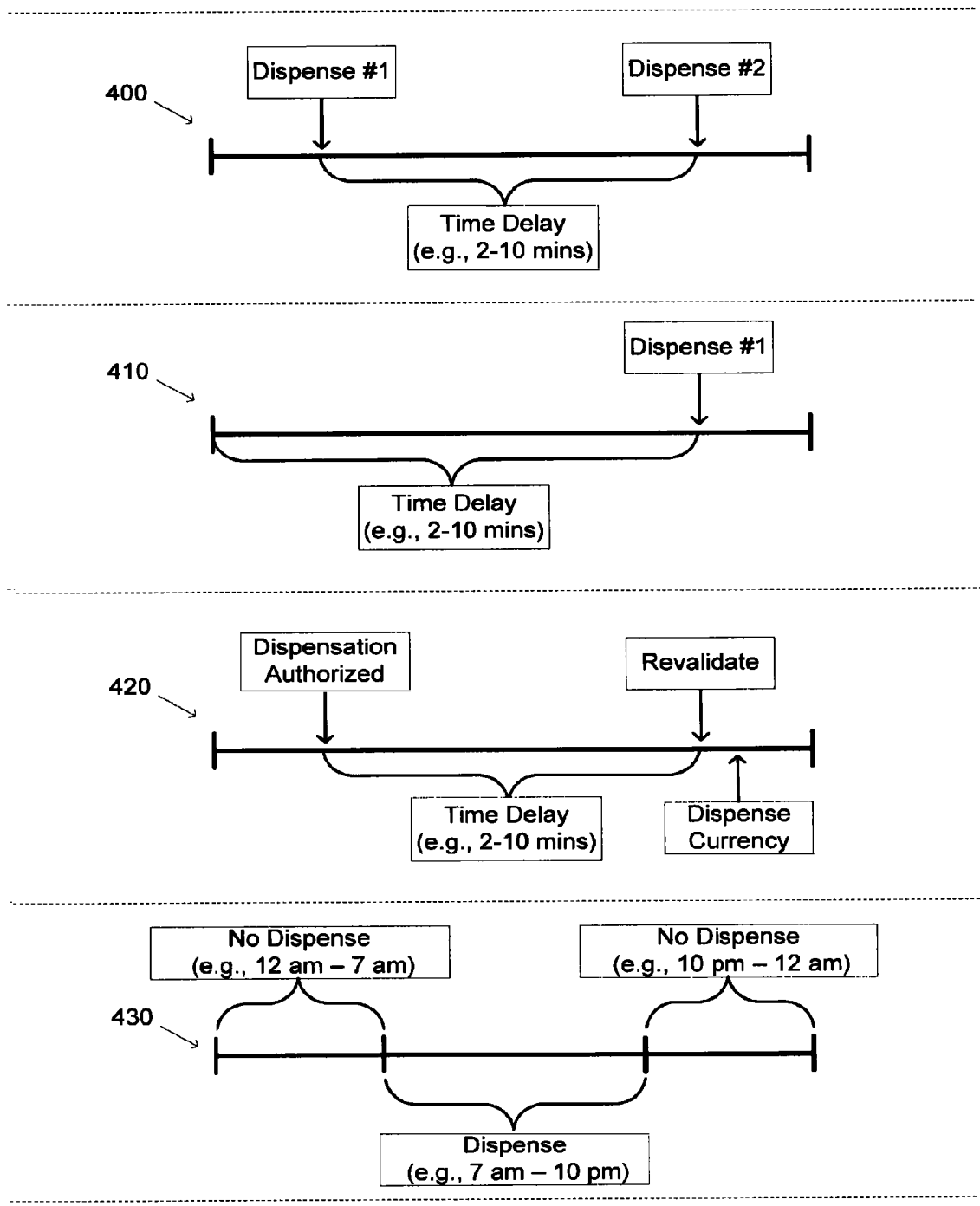
FIG. 4 illustrates several currency dispensation time delays.

If an appropriate desired withdrawal amount is entered, CDCS 10 either dispenses the requested cash (when the CDCS 10 includes a postdelay dispensation or when the CDCS lacks a timed delay dispensation functionality) or, as illustrated in timeline 420 of FIG. 4, CDCS 10 enters a delay period during which CDCS 10 becomes inactive, as described above. According to a preferred embodiment, the CDCS 10 will resume the delay after power-up if the CDCS 10 is powered down during a delay period (e.g., so that the delay cannot be defeated by unplugging or resetting the CDCS 10). Upon expiration of the delay period, display 16 may dispense the cash or may request that the user reenter the user's PIN, card, or both. In the latter instance, the time-release system sends a signal to bill dispenser 20 instructing it to effect currency dispensation following correct reentry of the PIN. Correct reentry of the PIN may also optionally initiate recording of the dispensation.

In an alternative preferred implementation, CDCS 10 includes a dispensation timing system that regulates the timing of each currency control system dispensation such that a dispensation may be effected only during a specified period of time, thereby preventing dispenses of currency outside of the specified period of time. This system ensures authorization of the card holder to withdraw money at a specific time. For example, as shown in timeline 430 of FIG. 4, the CDCS 10 could be programmed so that no cash withdrawals are permitted during certain time periods, such as when the store is closed. In this way, the dispensation timing system minimizes the incidence of robbery of the safe by either employees or outsiders. As another example, a first-shift employee would not be eligible to withdraw currency from the CDCS during the second or third shift time intervals. In this implementation, currency control system 38 compares the time of day at which the currency control system dispensation is requested to the permissible dispensation times listed in a set of tables housed in site parameters 36 of software 32. If the user is not authorized to request a dispensation at that time, the transaction sequence is terminated (and the event is logged). The user is preferably informed of the termination of the transaction sequence by an error message that appears on display 16. The error message may indicate, for example, that that user is ineligible for dispenses at that time. Of course, during any of the time delays the CDCS 10 may still operate in the standard ATM mode.

In another preferred implementation, CDCS 10 includes a time release system 42 that prevents CDCS 10 from conducting another currency control system-generated cash dispensation for a preprogrammed period of time before (see, e.g., timeline 410 of FIG. 4) or after (see, e.g., timeline 400 of FIG. 4) a currency dispensation. A preferred period of time is between about one minute to about 99 minutes. Currency control system 38 may generate a timed delay between dispenses, a predispensation delay, a postdispensation delay, or a combination thereof. One advantage of a predispensation delay is that it deters theft of the commercial establishment since a robber would have to wait in the commercial establishment, risking detection and/or capture, until the delay period expired before he or she was able to obtain currency dispensation. In an alternative preferred embodiment, CDCS 10 includes a clock (or timer) that alerts the user to the delay. The timer can count either up to reach the total time of the delay or down from the total time of the delay.

Figure 2:
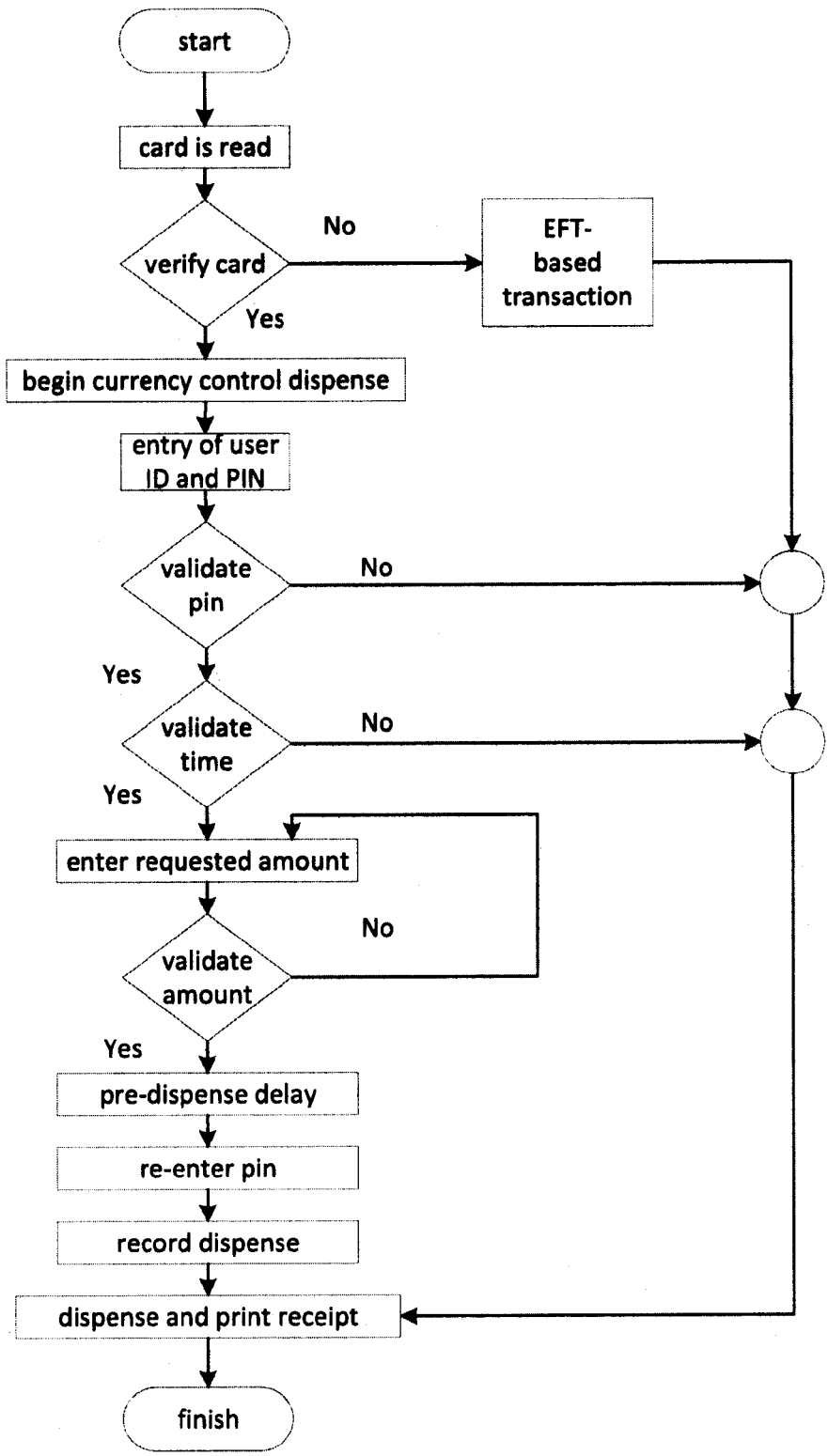
FIG. 2 is a flow diagram showing the CDCS of FIG. 1 effecting a predelay dispensation operational path, according to one embodiment.

FIG. 2 is a flow diagram showing an exemplary set of steps comprising a predelay dispensation operational path for operation in a CDCS having a time release system and requiring that the user reenter the user's PIN following the predispensation delay. First, card reader 18 reads the inserted or swiped magnetic stripe card. Then, a comparison of the data on the card with data tables stored in site parameters 36 is conducted by software 32. If a match is not found, the transaction is assumed to be a standard ATM transaction and modem 22 contacts an EFT network. If a match is found, the merchant or merchant-approved user is asked to enter his or her user ID, PIN, or both.

Next, a comparison of the entered identification data with data tables stored in site parameters 36 of software 32. If a match is not found, an error message appears on display 16. If a match is found, a time release system verifies that the merchant or merchant-approved user is permitted to withdraw currency at the time at which the currency is requested. To effect this determination, a comparison of the entered identification data with time release data tables stored in the site parameters 36 portion of software 32 is conducted. If a match is not found, an error message appears on display 16. If a match is found, CDCS 10 posts a message on display 16 requesting that the merchant or merchant-approved user enter the requested withdrawal amount using keypad 14. A dispensation control system compares the desired withdrawal amount entered by the merchant or merchant-approved user with parameter data 36. If the desired withdrawal amount exceeds the maximum withdrawal amount defined as a parameter data 36, the operating sequence is terminated and the merchant or merchant-approved user may preferably be asked to enter an alternative desired withdrawal amount. If all of three separately entered desired withdrawal amounts exceed the maximum withdrawal amount, the merchant or merchant-approved user is informed by an error message that appears on display 16 that the transaction has been terminated (and the event may be logged).

If the requested withdrawal amount is accepted, CDCS 10 preferably posts a message on display 16 informing the merchant or merchant-approved user that CDCS 10 is entering a timed delay phase during which currency control system 38 is inaccessible for further transactions. The timed delay may last anywhere from one minute to 99 minutes. Following expiration of the timed delay period, the merchant or merchant-approved user may be asked to reenter his or her PIN number. Another comparison of the entered identification data with data tables stored in the site parameters 36 is conducted. If a match is not found, an error message appears on display 16. If a match is found, the currency is dispensed and the dispensation is recorded. Preferably, printer 24 prints a receipt for the merchant or merchant-approved user.

In another preferred implementation, CDCS 10 includes a dispensation control system that compares the desired withdrawal amount entered by the merchant or merchant-approved user with parameter data 36 stored in software 32. If the desired withdrawal amount exceeds the maximum withdrawal amount, the operating sequence is terminated and the merchant or merchant-approved user may preferably be asked to enter an alternative desired withdrawal amount. If all of three separately entered desired withdrawal amounts exceed the maximum withdrawal amount, the merchant or merchant-approved user is informed by an error message that appears on display 16 that the transaction has been terminated. If the requested withdrawal amount is accepted, the dispensation is effected. According to one embodiment, maximum dispensation amounts are between approximately $100 and approximately $600, but optionally the maximum dispensation amount may be programmed by the owner/operator of the establishment housing the CDCS. In addition, certain maximum dispensation amounts or a change in maximum dispensation amounts may trigger additionally layers of security.

CDCS 10 may also include a user identification and authorization system that mandates entry of a user identifier and/or personal identification code related to each individual user or each individual site. For example, the user identification and authorization system may require entry of a user identifier and a personal identification code that are compared with a master list defining a set of users entitled to access the currency control system. The user identifier may be, for example, data contained on the magnetic swipe card or any other identifying user data, such as a PIN or biometric data such as a retinal scan, fingerprint scan, or RF identification. For example, in one preferred implementation, currency control system 38 is activated by the insertion or swiping of magnetic cards including magnetically embedded data that instructs the CDCS not to use the EFT network. In an alternative preferred implementation, currency control system 38 is activated by the entry of a PIN. The user identifier, PIN, or both correlate to a user known by software 32 and stored in a reference table housed in parameter data 36. When the data entered into the user identification and authorization system is incorrect, the transaction is preferably voided and display 16 informs the merchant or merchant-approved user that the user's PIN is invalid.

In an alternative preferred implementation, the currency control system includes a duress dispensation system that alerts a set of persons to the occurrence of a robbery when a merchant or merchant-approved user is forced to request a dispensation against his or her will. For example, when a merchant or merchant-approved user is being threatened by a robber who is demanding money, the merchant or merchant-approved user requests a dispensation using the above-mentioned magnetic stripe card. The merchant or merchant-approved user may then enter a duress dispensation PIN that causes the preprogrammed amount of cash to be dispensed and recorded while an external and/or internal operation alerts a set of individuals to the occurrence of a robbery. Exemplary external operations include alerting the police, a private security company, and/or management of the establishment to the presence of a robber. Exemplary internal operations include custom hardware that interfaces with an input/output port to trigger an on-site silent alarm system, on-site cameras, or on-site video recorders. Being unfamiliar with operation of CDCS 10, the robber is unaware that a duress code has been entered. To avoid arousing suspicion by the robber and to make it easy for the merchant or merchant-approved user to remember the duress dispense, a preferred duress dispensation PIN is similar (or identical) in length (and/or sequence) to the normal PIN. For example, instead of entering the correct PIN, the PIN may be modified by adding or subtracting a digit from the last digit in the PIN (e.g., a PIN of 1234 has a duress dispensation PIN of 1235 or 1233). However, any suitable transformation of the PIN will work. Further, the duress dispensation PIN may be a duress code that is recognized for all users. For example, a PIN of 6666 could be the duress dispensation code for all users.

Figure 3:
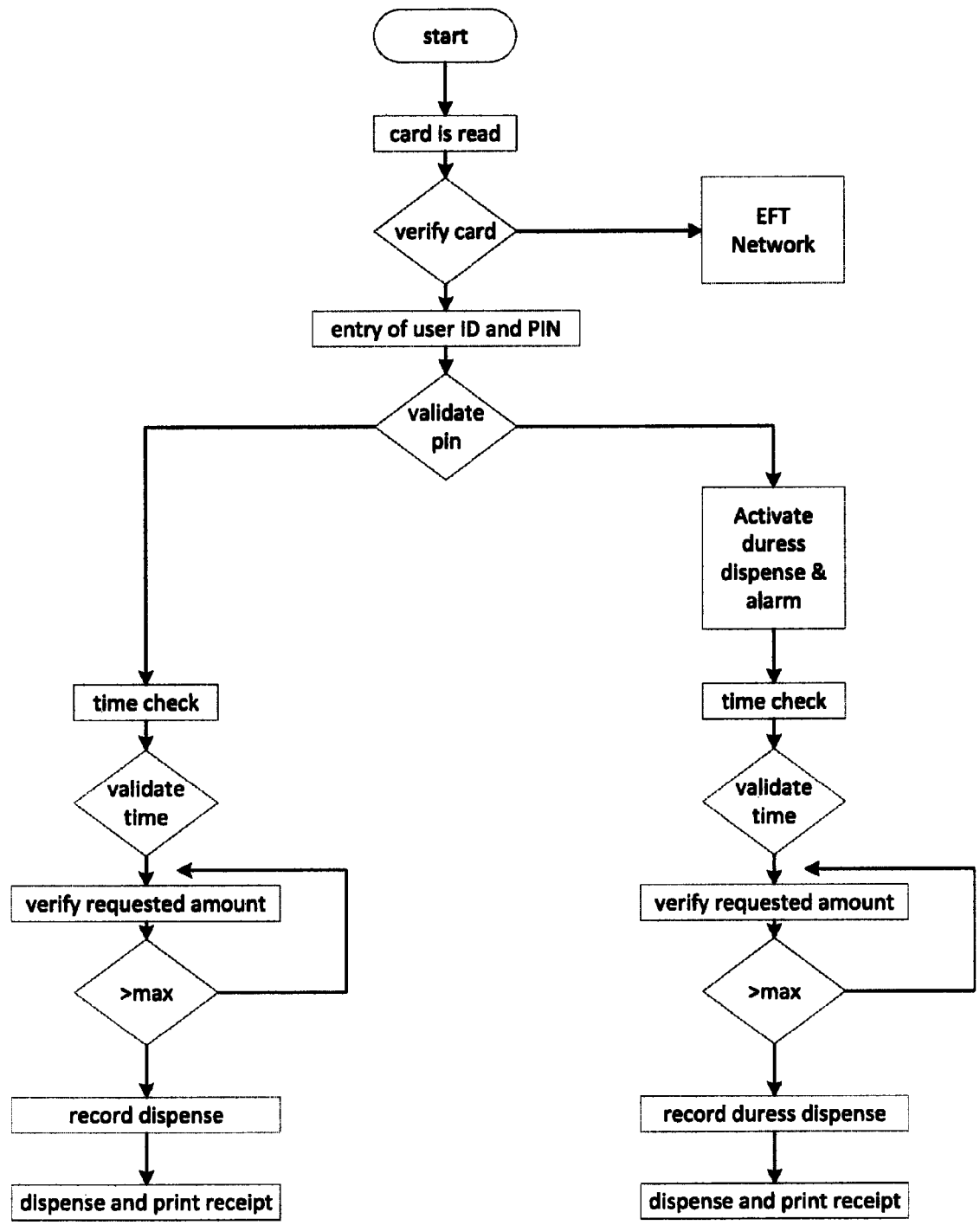
FIG. 3 is a flow diagram showing the CDCS of FIG. 1 effecting a duress dispensation operational path, according to one embodiment.

FIG. 3 is a flow diagram showing an exemplary set of steps comprising a duress dispensation operational path for operation in a CDCS having a time release system. First, card reader 18 reads the inserted or swiped magnetic stripe card. Then, software 32 effects a comparison of the data on the card with data tables stored in site parameters 36. If a match is not found, the transaction is assumed to be a standard ATM transaction and modem 22 contacts an EFT network. If a match is found, the merchant or merchant-approved user is asked to enter his or her user ID and/or PIN. The user enters his or her duress dispensation PIN.

Next, software 32 effects a comparison of the entered PIN with data tables stored in site parameters 36. If a match is not found, an error message appears on display 16. If a match is found, software 32 performs an internal and/or external operation to alert specified individuals of the occurrence of a robbery. Simultaneously, a time release system verifies that the merchant or merchant-approved user is permitted to withdraw currency at the time at which the currency is requested. To effect this determination, software 32 effects a comparison of the entered PIN with time release data tables stored in site parameters 36. If a match is not found, an error message appears on display 16. If a match is found, CDCS 10 posts a message on display 16 requesting that the merchant or merchant-approved user enter the requested withdrawal amount using keypad 14. A dispensation control system compares the desired withdrawal amount entered by the merchant or merchant-approved user with parameter data 36 stored in software 32. If the desired withdrawal amount exceeds the maximum withdrawal amount defined as a parameter of parameter data 36, the operating sequence is terminated and the merchant or merchant-approved user may preferably be asked to enter an alternative desired withdrawal amount. CDCS 10 dispenses the currency and the dispensation is recorded as a duress dispense. Preferably, printer 24 prints a receipt for the merchant or merchant-approved user.

Remote Currency Dispense and Control Systems

While embodiments have been described for which at least a portion of the functionality of the CDCS 10 may be included in an ATM, other configurations, for example a remote CDCS, may be implemented. In one embodiment, at least the software 32 and the decision logic included therein may reside in and be executed by a remote processor that may be accessible by one or more ATMs. Further, for those transactions requiring standard ATM access, an embodiment routes the request to and receives approval from one or more electronic fund transfer (EFT) networks, such as interbank networks (e.g., PLUS, Cirrus, Interac, Star, Pulse, Maestro, or Exchange) or other proprietary networks that transmit financial information and to which access is restricted. From the user's or customer's perspective, whether the transaction is related to a standard ATM transaction or a time release safe transaction, the location of the software 32 and decision logic included therein is not perceived.

The separation and centralization of at least a portion of the functionality of the remote CDCS may offer several advantages. For example, off-the-shelf ATMs may be employed with no modification. More specifically, each brand of ATM communicates with, for example, an electronic fund transfer network via a standard protocol. Rather than interfacing with or altering the source code of each ATM make and model, the remote CDCS may universally communicate with the ATMs via standard protocol(s) to achieve the same functionality. Further, a single remote CDCS may communicate with multiple off-the-shelf ATMs simultaneously to facilitate currency dispensation. Thus, the remote CDCS may provide a central point for adding and/or deleting authorized users (e.g., certain retail clerks) for numerous sites, monitoring activity for numerous sites, and managing reports for one or more sites.

The remote CDCS may be located away from the ATM in a more secure location as well as a location where additional physical layers of security may be provided. In addition, the remote location may provide a more reliable power system, such as a backup power source that may not otherwise be available or economical at an ATM location. The remote CDCS may further communicate with one or more electronic fund transfer networks for those transactions requiring approval from an electronic fund transfer network.

Figure 5:
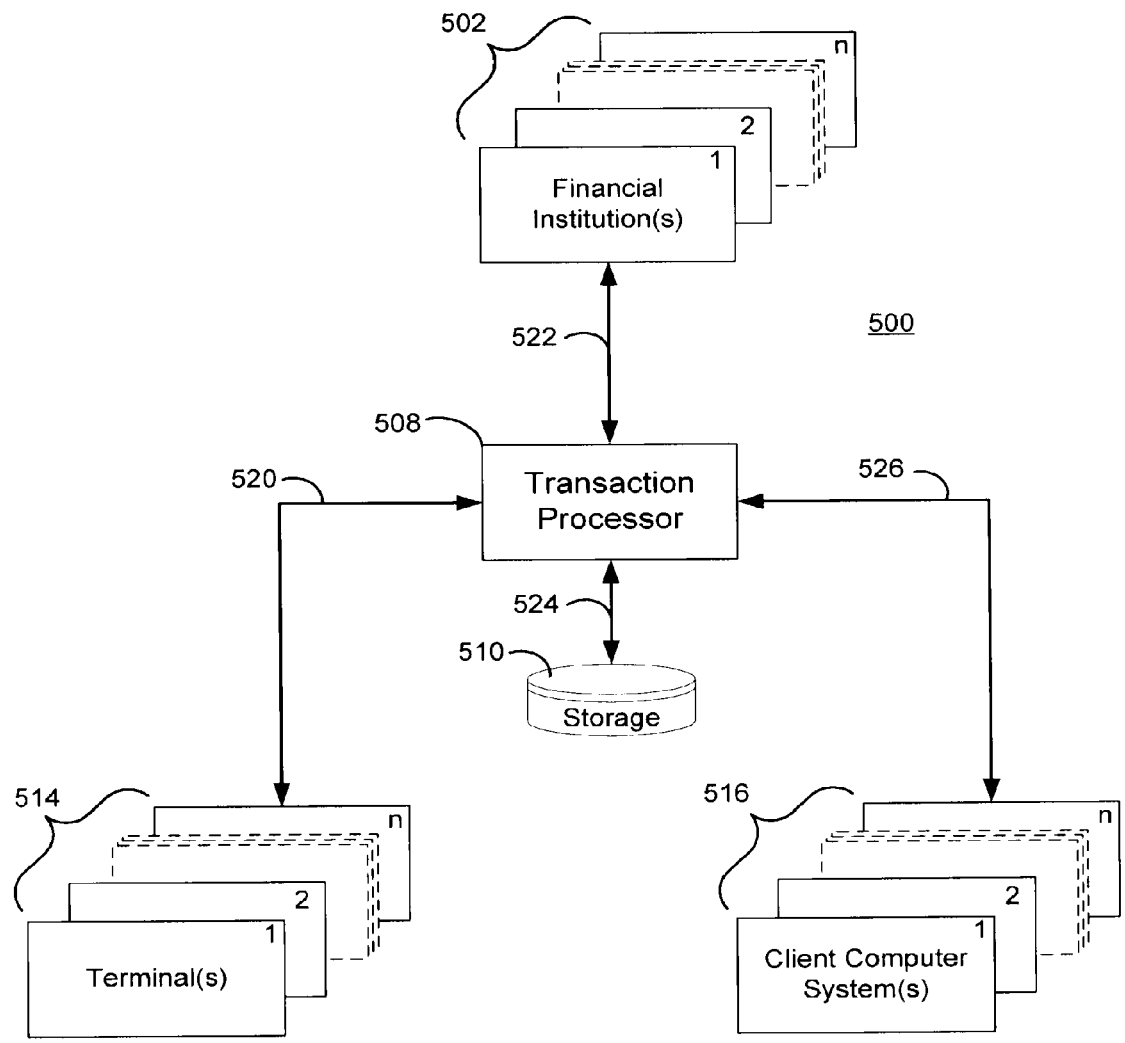
FIG. 5 is a block diagram illustrating a CDCS according to a second embodiment.

Referring now to FIG. 5, a currency dispense and control system (CDCS) 500 will be described according to one embodiment. Generally, before using the CDCS 500, a user is issued a card and is assigned (or selects) a PIN. The card may be issued by one of the financial institutions 502 (e.g., a bank, credit union, credit card company, stock brokerage, or other institution that collects funds from the public to place in financial assets such as stocks, bonds, money market instruments, bank deposits, checking account deposits, or loans) or may be issued to the user at the direction of a merchant. In addition, the card may be issued by the installer or owner of transaction processor 508. For example, a convenience store may request a card for a newly hired manager so the new manager can access the time-release safe functions of an on-site ATM. The card may have a magnetic stripe, optical code (e.g., bar code), radio frequency identification circuit or a smart card containing a memory chip for storing a card number and possibly security information. In the case of a magnetic stripe, the card number may be governed by ISO 7812 and contain a single-digit major industry identifier (MII), a six-digit issuer identifier number (IIN) or bank identifier number (BIN), an account number, and possibly a checksum digit.

Transaction processor 508 may include software 32 and decision logic to process transactions relating to standard ATM transactions or time release safe transactions. Accordingly, the transaction processor 508 may communicate with one or more terminals 514 via data link 520 and one or more financial institutions 502 via data link 522. In addition, one or more client computer systems 516 may communicate with the transaction processor 508 via data link 526 to allow, for example, merchants to access data associated with the merchant (e.g., transactions by merchant-approved users) or make requests associated with the merchant (e.g., terminate a fired employee's access to the merchant's time release safe). The data links 520, 522, and 526 may comprise any suitable means of connecting one device to another for the purpose of transmitting and receiving data.

Conceptually, the transaction processor 508 may include an application program that accepts connections in order to service requests by sending back responses and may also include devices to run such applications. Accordingly, the transaction processor 508 may include one or more central processing units (CPUs), a graphical user interface, input/output devices, internal/external storage 510, and a wired and/or wireless communication network interface or adapter.

Terminals 514 (e.g., ATMs, currency dispense and control systems capable of performing both traditional ATM transactions and merchant-initiated currency control transactions (e.g., CDCS 10), point of sale terminals, debit point of sale terminals, computers, and cash registers) serve as an interface between the user (or customer) and the transaction processor 508 and receive input from the user (or customer) and provide output to the user (or customer). For example, after a user (or customer) swipes their card the terminal 514 captures card data and prompts the user (or customer) to input their PIN and a transaction amount. Some or all of this information may be passed along with a terminal identification to the transaction processor 508 via the data link 520. If necessary, an appropriate security protocol may used. The data link 520 may take various forms, such as those described with reference to FIGS. 6, 7, and 8.

Figure 6:
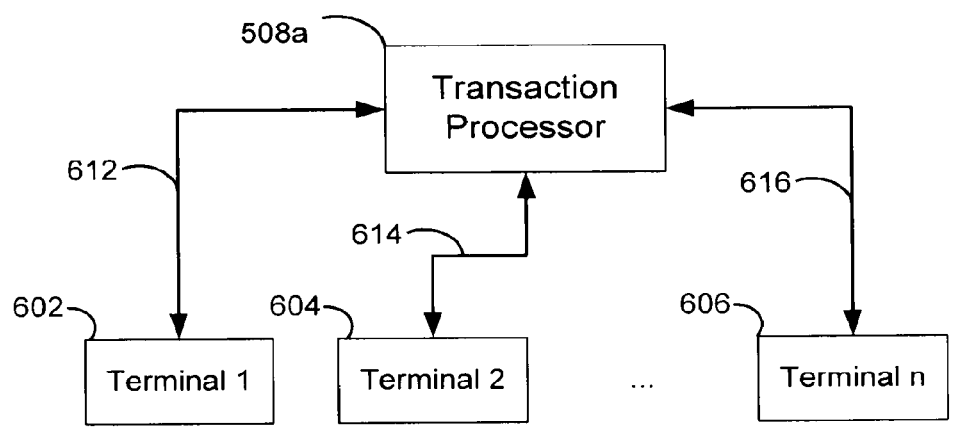
FIG. 6 is a block diagram illustrating the communication between one or more terminals and a transaction processor according to one embodiment.

According to the embodiment shown in FIG. 6, terminals 602, 604 and 606 individually connect to the transaction processor 508*a* via data links 612, 614, and 616 (in FIG. 6 reference numerals with a superscripted symbol, e.g., 508*a*, indicate elements similar to those of the same name as those described with respect to FIG. 5, i.e., the transaction processor 508). For example, terminals 602, 604 and 606 may include internal/external modems that connect to one or more internal/external modems associated with the transaction processor 508*a* via a POTS line or leased line. The modems may include voiceband modems, cable modems, digital subscriber line (DSL) modems, radio modems (e.g., microwave radio links), and optical modems. Further, data links 612, 614, and 616 may also include a data bus utilizing any protocol, such as Advanced Technology Attachment (ATA), Personal Computer Memory Card International Association (PCMCIA), and Universal Serial Bus (USB), or a wireless connection using electromagnetic waves to transmit data using any wireless protocol, such as Bluetooth, WiFi, WiMAX, and IEEE 802.11.

Figure 7:
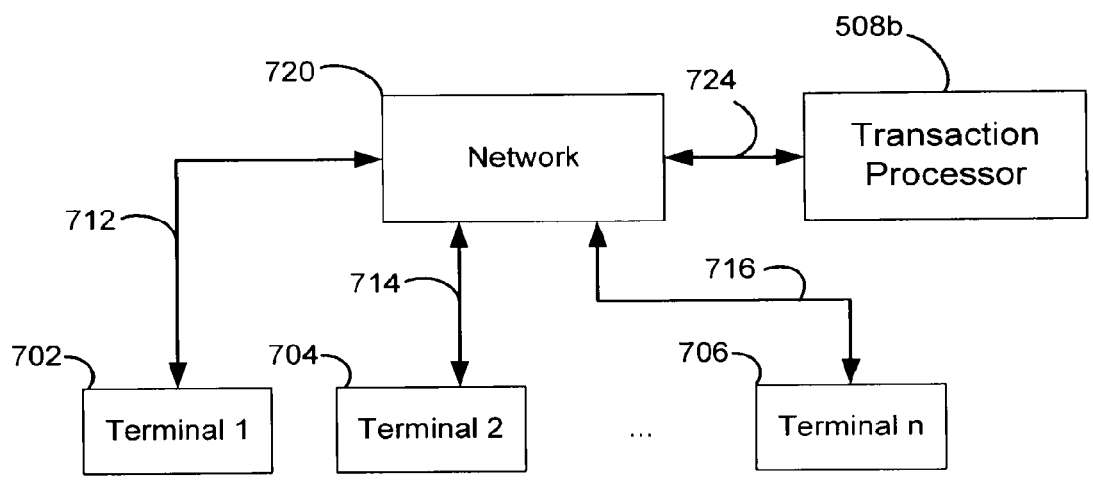
FIG. 7 is a block diagram illustrating the communication between one or more terminals and a transaction processor according to another embodiment.

According to the embodiment shown in FIG. 7, terminals 702, 704 and 706 connect to the transaction processor 508*b* via network 720 and data links 712, 714, 716, and 724 (in FIG. 7 reference numerals with a superscripted symbol, e.g., 508*b*, indicate elements similar to those of the same name as those described with respect to FIG. 5, i.e., the transaction processor 508). The network 720 transmits any combination of voice, video, and data between devices, such as transaction processor 508*b* and terminals 702, 704, and 706. The network 720 may be wired or wireless and may include a network operating system (e.g., operating on client and/or server machines), supporting hardware (e.g., network interface cards (NICs), bridges, routers, and switches), cables, antennas, and towers. For example, the network 720 may include a personal area network utilizing wired connections, such as a USB or FireWire bus, or wireless connections, such as infrared data association (IrDA) or Bluetooth protocols. By way of another example, the network 720 may comprise a local area network (LAN), such as a computer network covering a small geographic area (e.g., an office or a group of buildings). In the case of a LAN, the transaction processor 508*b* and terminals 702, 704, and 706 may be linked together in various manners. For example, terminals 702, 704, and 706 and the transaction processor 508*b* may include NICs and links 712, 714, 716, and 724 may include wired or wireless connections and their associated hardware (e.g., repeaters, hubs, bridges, switches, and routers). In addition, one or more of the terminals 702, 704, and 706 may include a modem that connects to the network 720 via a leased line or a POTS line.

Figure 8:
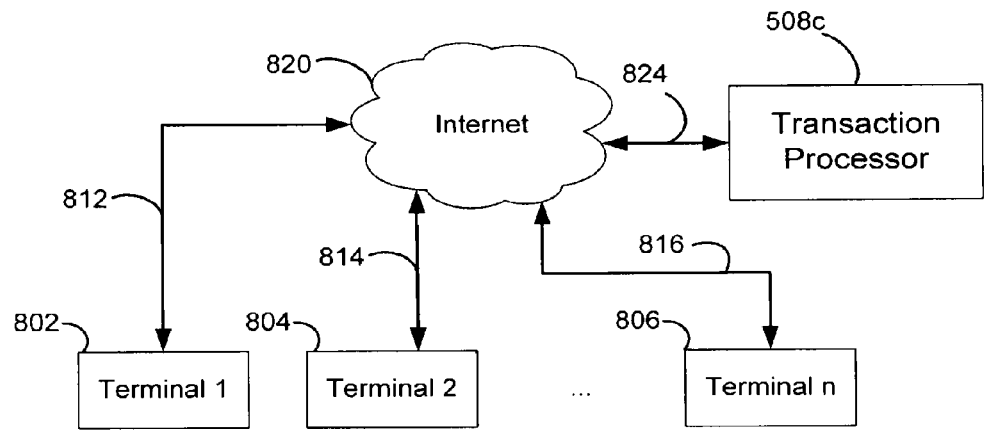
FIG. 8 is a block diagram illustrating the communication between one or more terminals and a transaction processor according to yet another embodiment.

Furthermore, as shown in FIG. 8, terminals 802, 804 and 806 connect to the transaction processor 508*c* via a wide area network (WAN), such as internet 820, and data links 812, 814, 816, and 824 (in FIG. 8 reference numerals with a superscripted symbol, e.g., 508*c*, indicate elements similar to those of the same name as those described with respect to FIG. 5, i.e., the transaction processor 508). The terminals 802, 804 and 806 and the transaction processor 508*c* may connect to the internet via any number of internet service providers (ISPs). Accordingly, data links 812, 814, 816, and 824 may include any of the wired or wireless connections previously described with reference to FIGS. 5, 6, and 7.

Referring again to FIG. 5, a data storage device 510 may be provided for storing data and/or processing information. The storage device 510 stores data, data structures, and computer-executable instructions, such as an operating system, one or more application programs, and program modules/components in encrypted or unencrypted form. All or portions of the operating system, applications, modules/components, and data may be cached in RAM or may be stored remotely (see, e.g., storage device 510a in FIG. 9). Accordingly, data link 524 that connects the transaction processor 508 to the storage device 510 may include any of the wired or wireless connections described with reference to FIGS. 5, 6, 7, and 8.

The storage device 510 may include the data and data tables associated with site parameters 36 and record 40 (FIG. 1). For example, the storage device 510 may include a database containing records that link various cards (e.g., account numbers included in card data) to authorized terminal identifications (e.g., one or more of the terminals 514), maximum transaction amounts (e.g., maximum transaction amounts per transaction or maximum transaction amounts per posting day), PINs, and other data (e.g., time delay data). These associations allow merchants to control the level of access of various employees. For example, one merchant might have 20 locations each having a terminal 514 and another merchant might have 15 locations each having a terminal 514. To prevent merchant-approved users associated with the 15-location merchant from making withdrawals at terminals associated with the 20-location merchant, certain cards may only be authorized for use on certain terminals. In addition, a merchant may grant a merchant approved manager a larger maximum transaction amount than a merchant approved employee (e.g., a clerk).

The storage device 510 may also store transaction data, such as transaction amounts, terminal identifications, all or a portion of the card data, transaction date and time, etc. This data may help identify a robbery and mitigate loss. For example, before authorizing a request, the transaction processor 508 may check whether the same card has recently been used at the same terminal to make a withdrawal. If the time period between withdrawals is too short, transaction processor 508 may prevent subsequent withdrawals.

Figure 9:
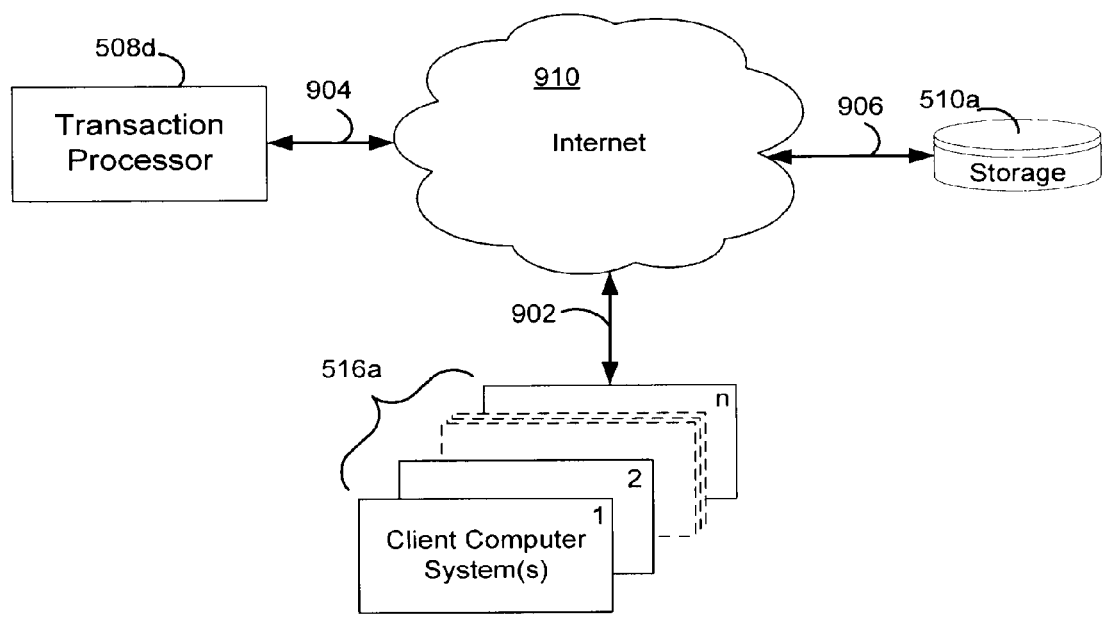
FIG. 9 is a block diagram illustrating the communication between one or more client computer systems and a transaction processor according to one embodiment.

In addition, merchants may use the stored transaction data to request reports of activity associated with their cards and terminals. For example, a merchant might use one of the client computer systems 516 to request when and where each associated card has been used and how much money has been withdrawn using the card. Further the merchant may use one of the client computer systems 516 to manage their associated cards. For example, the merchant may be able to log into the transaction processor 508 to deactivate a terminated employee's card, request a card for a new employee, request a PIN for a card issued to a new employee, set the maximum transaction amounts, and control access times. The one or more client computer systems 516 communicate with the transaction processor 508 via data link 526 (which may take various forms). For example, as shown in FIG. 9, the one or more client computer systems 516a may connect to the transaction processor 508d via internet 910 and data links 902, 904, and 906 (in FIG. 9 reference numerals with a superscripted symbol, e.g., 508d, indicate elements similar to those of the same name as those described with respect to FIG. 5, i.e., the transaction processor 508). The client computer systems 516a and the transaction processor 508d may connect to the internet 910 via any number of internet service providers (ISPs). In addition, the client computer systems 516a, the transaction processor 508d, and the storage device 510a may be connected in other ways, such as those described with reference to FIGS. 5, 6, 7, and 8. Accordingly, data links 902, 904, and 906 may include any of the wired or wireless connections previously described with reference to FIGS. 5, 6, 7, and 8. Further, merchants may communicate with the transaction processor 508 or the transaction processor operator using other methods, such as by electronic mail, fax, phone, and mail.

Figure 10:
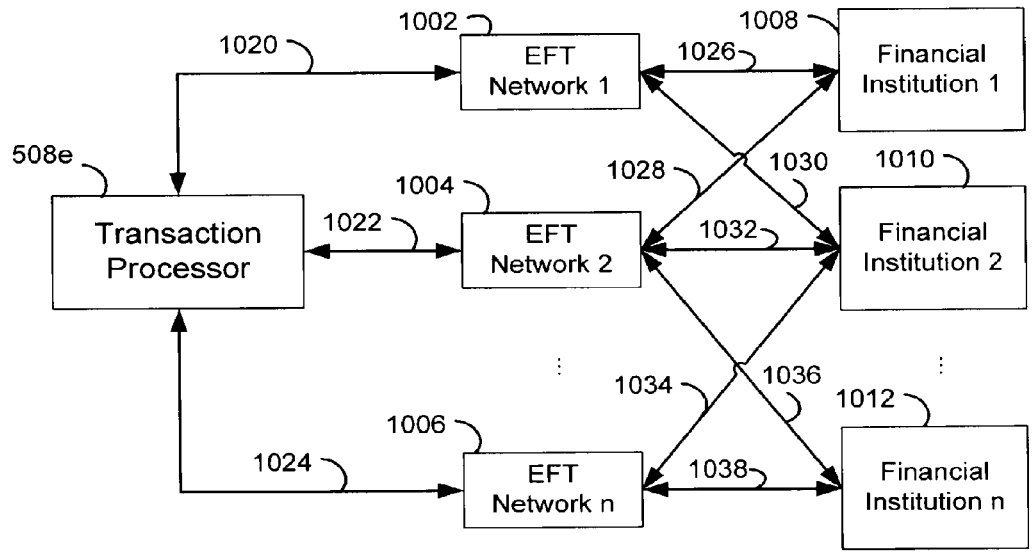
FIG. 10 is a block diagram illustrating the communication between one or more financial institutions and a transaction processor according to one embodiment.

In certain embodiments, the transaction processor 508 may be required to check with one of the financial institutions 502 before authorizing the transaction. For example, the transaction processor 508 may need to verify the customer's account data and verify that the customer has sufficient funds. The transaction processor 508 may connect to one of the financial institutions 502 via data link 522, which may take various forms. By way of example, if transaction processor 508e handles a sufficient volume of requests, it might connect directly to electronic fund transfer networks 1002, 1004, and 1006, as shown in FIG. 10. Otherwise, it might be more cost effective to access the electronic fund transfer networks via a gateway 1150, as shown in FIG. 11.

FIG. 10 illustrates transaction processor 508e communicating with financial institutions 1008, 1010, and 1012 via electronic fund transfer networks 1002, 1004, and 1006 and data links 1020, 1022, 1024, 1026, 1028, 1030, 1032, 1034, 1036, and 1038 (in FIG. 10 reference numerals with a superscripted symbol, e.g., 508e, indicate elements similar to those of the same name as those described with respect to FIG. 5, i.e., the transaction processor 508). Certain electronic fund transfer networks may provide access to some financial institutions, but not others. Thus, the transaction processor 508e may be able to communicate with more than one electronic fund transfer network to access additional financial institutions. For example, as shown in FIG. 10, the electronic fund transfer network 1002 (e.g., PLUS, Cirrus, Interac, Star, NYCE, Exchange, etc.) provides access to financial institutions 1008 and 1010, but not financial institution 1012. Likewise, electronic fund transfer network 1006 provides access to financial institutions 1010 and 1012, but not financial institution 1008. The electronic fund transfer network 1004 provides access to financial institutions 1008, 1010 and 1012. Data links 1020, 1022, 1024, 1026, 1028, 1030, 1032, 1034, 1036, and 1038 may include any of the wired or wireless connections previously described with reference to FIGS. 5, 6, 7, 8, and 9.

Figure 11:
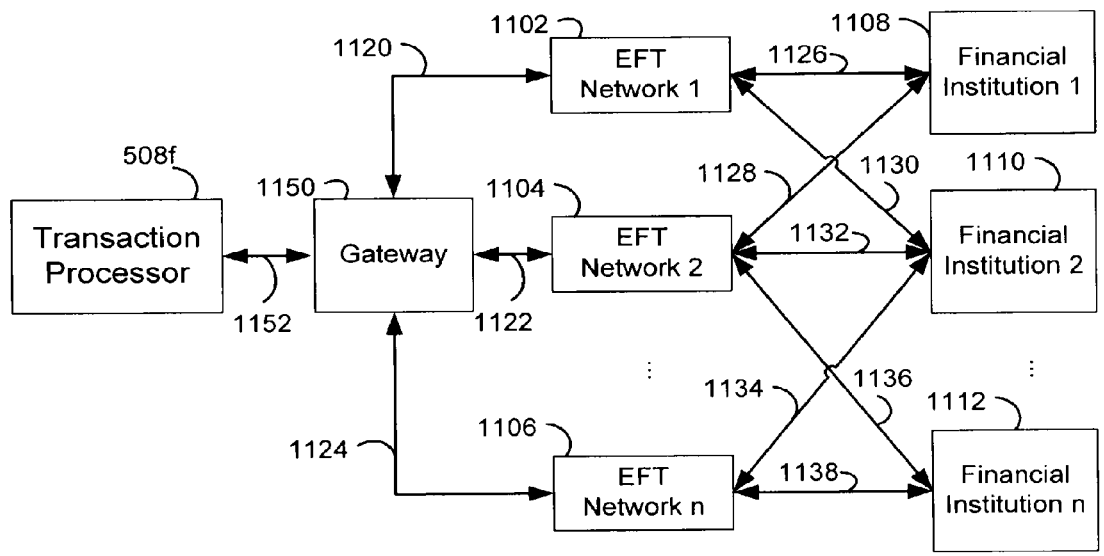
FIG. 11 is a block diagram illustrating the communication between one or more financial institutions and a transaction processor according to another embodiment.

FIG. 11 illustrates a transaction processor 508f communicating with the gateway 1150 that provides access to financial institutions 1108, 1110, and 1112 via electronic fund transfer networks 1102, 1104, and 1106 and data links 1120, 1122, 1124, 1126, 1128, 1130, 1132, 1134, 1136, 1138, and 1152 (in FIG. 11 reference numerals with a superscripted symbol, e.g., 508f, indicate elements similar to those of the same name as those described with respect to FIG. 5, i.e., the transaction processor 508). As shown in FIG. 11, the electronic fund transfer network 1102 (e.g., PLUS, Cirrus, Interac, LINK, etc.) provides access to financial institutions 1108 and 1110, but not financial institution 1112. Likewise, the electronic fund transfer network 1106 provides access to financial institutions 1110 and 1112, but not financial institution 1108. The electronic fund transfer network 1104 provides access to financial institutions 1108, 1110 and 1112. Data links 1120, 1122, 1124, 1126, 1128, 1130, 1132, 1134, 1136, 1138, and 1152 may include any of the wired or wireless connections previously described with reference to FIGS. 5, 6, 7, 8, 9, and 10. In addition, the transaction processors 508, 508e, and 508f may connect directly to one or more financial institutions, such as via a suitable communications link, such as a leased line, POTS line, LAN or WAN (not shown).

Figure 12:
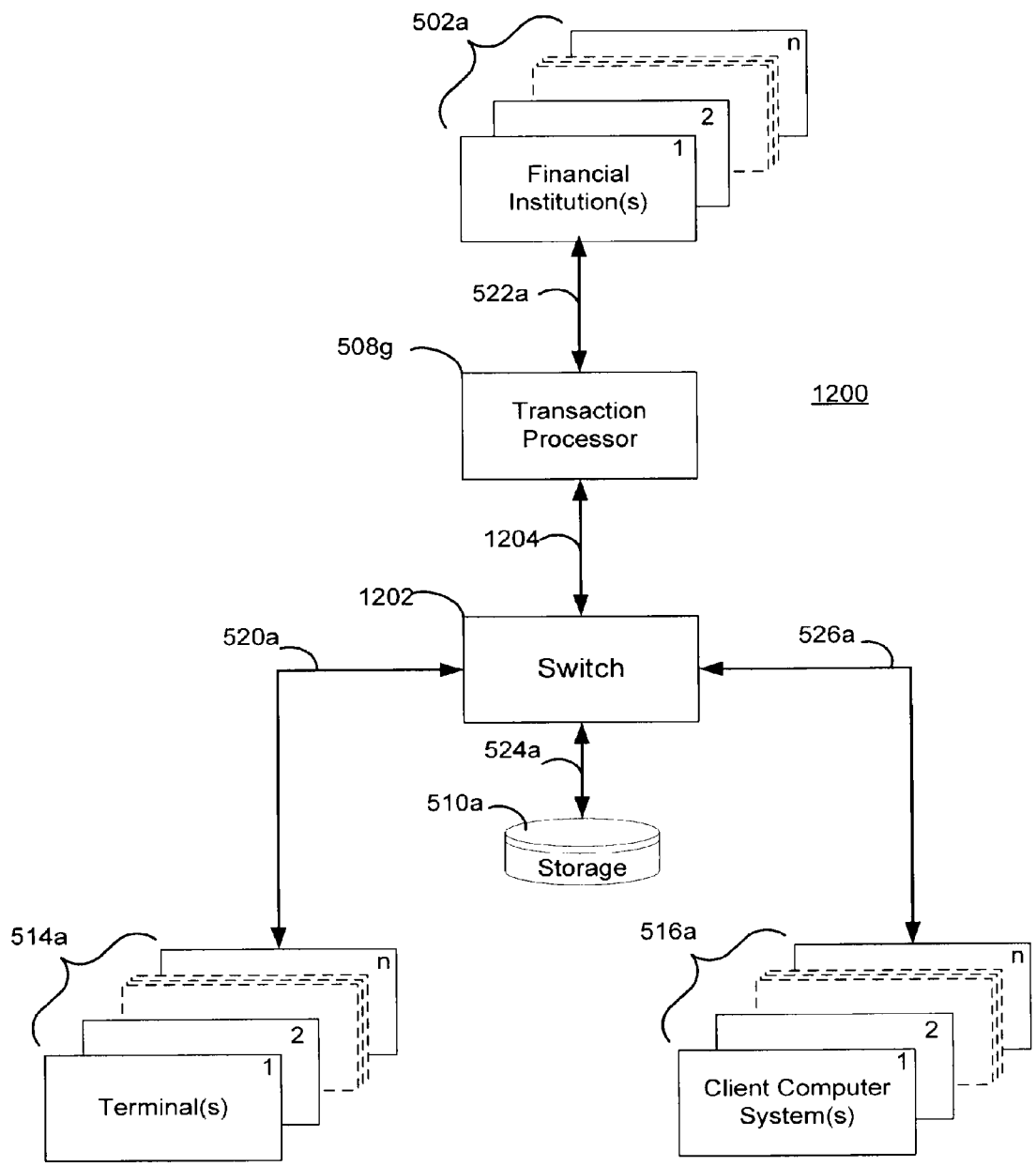
FIG. 12 is a block diagram illustrating a CDCS according to a third embodiment.

Referring now to FIG. 12, a currency dispense and control system (CDCS) 1200 will be described according to another embodiment (in FIG. 12 reference numerals with the prime symbol, e.g., 508g, indicate elements similar to those of the same name as those described with respect to FIG. 5, i.e., the transaction processor 508). Switch 1202 may include software 32 and include decision logic to process transactions relating to standard ATM transactions or time release safe transactions. Accordingly, the switch 1202 may communicate with one or more terminals 514a via data link 520a. If switch 1202 needs to check with one of the financial institutions 502a, switch 1202 may connect via one or more transaction processors 508g and data links 1204 and 522a. Thus, when dealing with a standard ATM transaction, switch 1202 acts as a conduit between transaction processor 508g and terminals 514a. Conceptually, the switch 1202 may include an application program that accepts connections in order to service requests by sending back responses and may also include devices to run such applications. Accordingly, the switch 1202 may include one or more central processing units (CPUs), a graphical user interface, input/output devices, internal/external storage 510a, and a wired and/or wireless communication network interface or adapter.

One or more client computer systems 516a may communicate with the switch 1202 via data link 526a to allow, for example, merchants to access data associated with the merchant (e.g., transactions by merchant-approved users) or make requests associated with the merchant (e.g., terminate a fired employee's access to the merchant's currency control system). The data links 520a, 522a, 526a, and 1204 include any means of connecting one device to another for the purpose of transmitting and receiving data. Thus, data links 520a, 522a, 526a, and 1204 may include any of the wired or wireless connections previously described with reference to FIGS. 5, 6, 7, 8, 9, 10 and 11.

Figure 13:
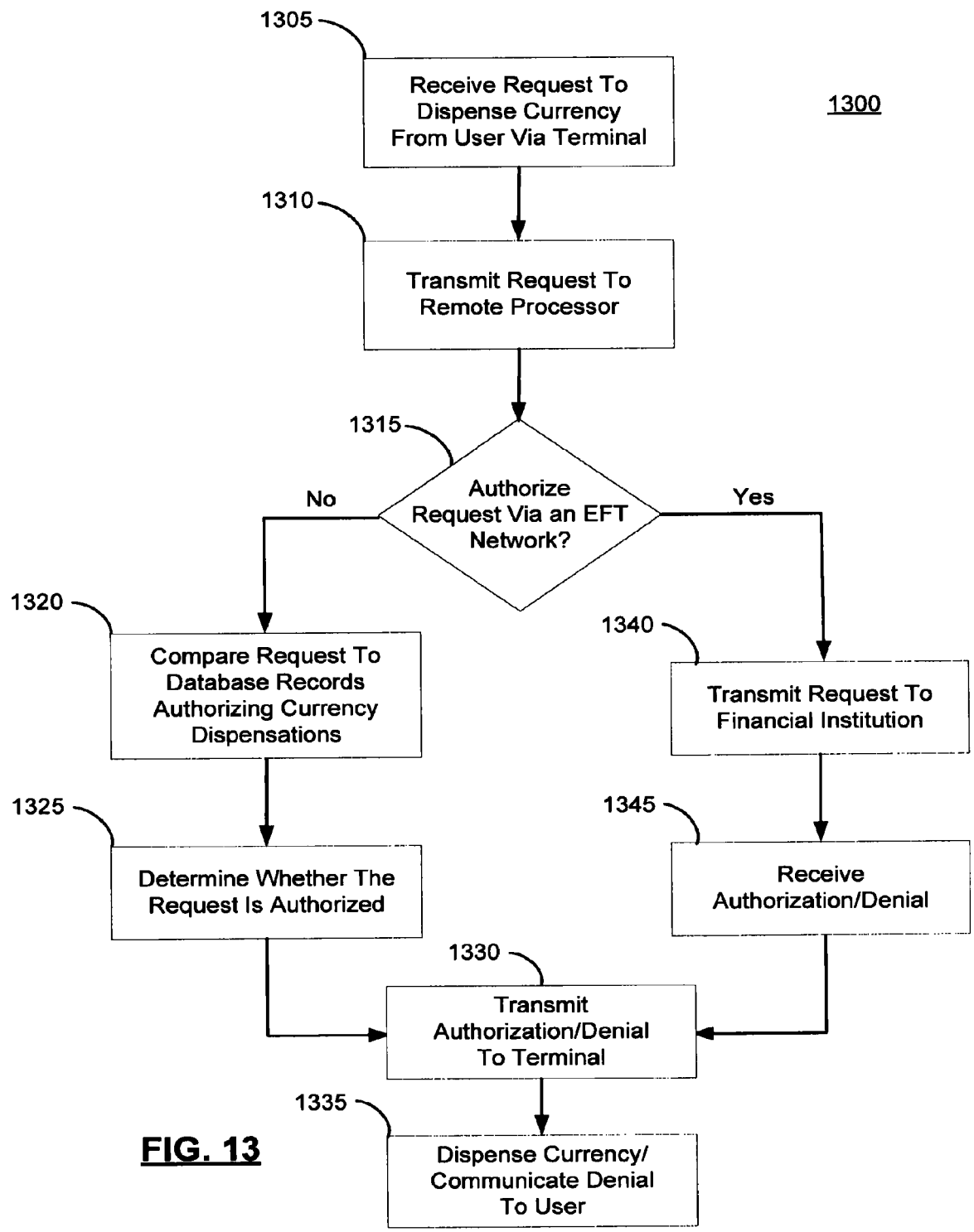
FIG. 13 is a flow diagram showing the operation of a CDCS according to one embodiment.

FIG. 13 is a flow chart of a method of authorizing a currency dispensation 1300 according to one embodiment. At step 1305, a request to dispense currency is received from a user (or customer) via a terminal (e.g., one of the terminals 514). For example, a merchant-approved user (e.g., convenience store manager or employee) or a convenience store customer may swipe or insert a transaction card (e.g., an ATM or special card) into an on-site ATM (similar to that illustrated in FIG. 1) so that the ATM can capture the card number (or at least some portion of it). The ATM then prompts the user (or customer) for their PIN and a transaction amount.

At step 1310, the request is sent to a remote processor, such as transaction processor 508 or switch 1202. For example, the on-site ATM may send all or a portion of the information it collected and/or has stored (e.g., its identification number) to the transaction processor 508 via data link 520. The data sent to the transaction processor may include one or more of the transaction amount, a terminal identification, card data (e.g., the MII, IIN and account number), a PIN, the date, and the time. According to one embodiment, the PIN indicates a transaction type, such as an electronic gaming station payout, lottery payout, a customer check cashing transaction, or a COD payment. The data may be sent in one transmission or may be divided among several transmissions separated by additional prompts. For example, according to one embodiment, after the card data is read and the PIN is entered, at least a portion of the card data and PIN are transmitted to the remote processor for verification (e.g., the transaction processor 508 may check whether the card data is associated with the PIN via a data table in storage device 510 or via data held by one of the financial institutions 502). If the card data and PIN (and perhaps other information) are verified, the terminal prompts the user (or customer) to enter a transaction amount.

The remote processor determines whether, based on the card data at step 1315, the request requires authorization from a financial institution via an electronic fund transfer network, such as an interbank network or other proprietary network that transmits financial information and to which access is restricted. For example, once cards are issued to the user at the direction of merchants, the account number associated with the card may be stored in storage device 510. The account numbers may be updated by the operator of the transaction processor 508 (or another appropriate party) and may also be mirrored among several transaction processors to expand service coverage. Upon receiving the request, the transaction processor 508 may compare the account number of the card associated with the request to the card data stored in storage device 510. If the transaction processor 508 does not find the account number stored locally, it may assume that the request requires authorization by one of the financial institutions 502 via data link 522 (e.g., via an electronic fund transfer network). The transaction processor 508 may also use the MII, IIN, BIN, PIN, unique transaction amount, or a combination of some or all of these to determine whether the request requires authorization via an electronic fund transfer network. In addition, the user may provide an indication that they want to use the time release safe functionality, such as by pressing a button on the terminal or responding to a prompt provided via the terminal.

If the request requires authorization via an electronic fund transfer network, the request is transmitted to one of the financial institutions 502 via data link 522 at step 1340. For example, the transaction processor 508 may identify the proper network or financial institution 502 based on information retrieved from the customer's ATM card and relay the appropriate information to the financial institution 502 via one or more of the electronic fund transfer networks 1002, 1004, or 1006 or gateway 1150. The financial institution 502 verifies the customer's account data and verifies whether the customer has sufficient funds available for the transaction amount. At step 1345, the financial institution 502 transmits an indication of an authorization or denial to the transaction processor 508 via data link 522 (e.g., a message indicating that the request has been authorized or denied). At step 1330, the transaction processor 508 transmits the indication of the authorization or denial to the terminal via data link 520. The terminal then either dispenses the currency or communicates the denial to the customer at step 1335.

If the request does not require authorization via an electronic fund transfer network (e.g., the request does not require checking the balance of an account at a financial institution), the request is compared to a database of records authorizing currency dispensations at step 1320. For example, storage device 510 may contain data records linking various cards to authorized terminal identifications and maximum transaction amounts. The transaction processor 508 may compare the received card data (e.g., the account number) to records in the database to determine whether the request is authorized at step 1325. For example, the transaction processor 508 may ensure that the card is authorized for use on the terminal and ensure that the transaction amount does not exceed a maximum transaction amount (e.g., a maximum transaction amount per transaction or maximum transaction amount per posting day). Ensuring that the card is authorized for use on a particular terminal may help prevent one merchant's employee from using a card at another merchant's terminal. In addition, the transaction processor 508 may ensure that the card is authorized for use on that date and/or at that time.

Further, the transaction processor 508 may generate a time delay, such as those previously described with reference to FIG. 4 (e.g., a time delay between dispensations, a predispensation delay, a postdispensation delay, or a combination thereof). For example, as shown by timeline 400 (FIG. 4), the transaction processor 508 may ensure that sufficient time has elapsed between successive transactions if the card has been recently used to dispense cash. As shown by timeline 410, the transaction processor 508 may delay the transmission of the authorization for a predetermined period of time or may simply wait a predetermined period of time before dispensing cash. For example, as illustrated by timeline 420, the transaction processor 508 may enter a delay period. After the expiration of the delay period, the transaction processor may transmit the authorization and/or request the user to re-swipe their card, reenter their PIN, or both, before dispensing the cash. According to one embodiment, one or more of the terminals 514 may download code to implement the time delay functionality or may otherwise be reprogrammed to implement the time delay functionality. For example, certain terminals 514 may be programmed to terminate a connection with the transaction processor 508 if no response is received within a certain period of time (e.g., 45 seconds). If a connection with the transaction processor is terminated, the transaction processor may need to reconnect to the terminal that disconnected its session after the delay period so that the transaction processor 508 can instruct the terminal to dispense the cash. Accordingly, the terminal may need to be reprogrammed to allow the transaction processor to reconnect or to keep the session open if the transaction processor 508 enters the delay period.

At step 1330, the transaction processor 508 transmits an indication of an authorization or denial to the terminal via data link 520. The terminal then either dispenses the currency or communicates the denial to the user at step 1335.

According to one embodiment, the financial institutions 502 and the transaction processor 508 communicate with an automated clearing house (ACH) via any suitable data link. For example, in the case of a standard ATM transaction, transaction processor 508 and financial institution 502 may send transaction information to the ACH. Because the terminal dispensed currency to the customer, the ACH facilitates crediting a bank account associated with the terminal 514. In the case of a time release safe transaction, the transaction processor 508 may send transaction information to the ACH. In this instance, the ACH facilitates debiting an account associated with the merchant-approved user's card (e.g., the merchant's account) and crediting an account associated with the terminal. For example, while the terminal may be located at a merchant's site, the terminal may be serviced by a third party. The ACH helps ensure that the bank account of the third party is balanced regardless of whether the transactions relate to a time release safe transaction or a standard ATM transaction.

Loyalty Rewards

In an embodiment for which the transaction processor 508 communicate with multiple terminals (e.g., multiple ATMs hosted by the same merchant) the transaction processor 508 may securely log transaction activity for the multiple ATMs. For example, the transaction activity may include the customer's card number, card data (e.g., the MII, IIN, BIN, account number, or a portion of the card number, such as the last four digits), transaction date, transaction amount, and any other data relevant to the transaction. Each time the customer completes a transaction at any one of the multiple terminals hosted by the merchant, a transaction log associated with the customer (e.g., stored in storage device 510) may be updated with cumulative transaction information. When the cumulative transaction log indicates that a pre-determined threshold has been reached or exceeded within a configurable period of time, the customer may be rewarded. Thus, data associated with a transaction is automatically recorded each time the customer completes a transaction and the customer is anonymously rewarded for repeated use of the merchant's terminals. In other words, the customer may be rewarded even if the customer does not register to be eligible to receive rewards. For example, the customer may be rewarded for their loyalty to the merchant after withdrawing a minimum aggregated transaction amount, completing a pre-determined number of transactions, and/or completing a predetermined number of transactions or withdrawing predetermined dollar amount in a configurable time period (e.g., 3 to 12 months). Upon being rewarded, the terminal may inform the customer that they have earned a reward and the nature of the reward. Additionally, the transaction receipt printed by the terminal (or another device, such as a debit point of sale device, if the terminal is not configured to print customized receipts or display customized messages) may also include an indication of the reward (specified by the merchant). More specifically, the terminal receipt may include a message, code, or the like that may be referenced by a clerk or other merchant employee for redemption. Alternatively, the transaction processor 508 may, in addition to notifying the customer via the terminal and/or receipt, notify the customer via other methods. For example, the merchant may send the customer a communication such as via regular mail, email, or telephone call, to notify them of the reward so long as the customer's contact information is voluntarily supplied by the customer. This communication may encourage the customer to make another visit to the merchant and encourage additional transactions and/or sales. Additionally, the transaction processor 508 may record reward data so that the merchant can review (e.g., via client computer system 516 and data link 526) which terminals result in rewards being offered and the nature of the rewards being offered.

Figure 14:
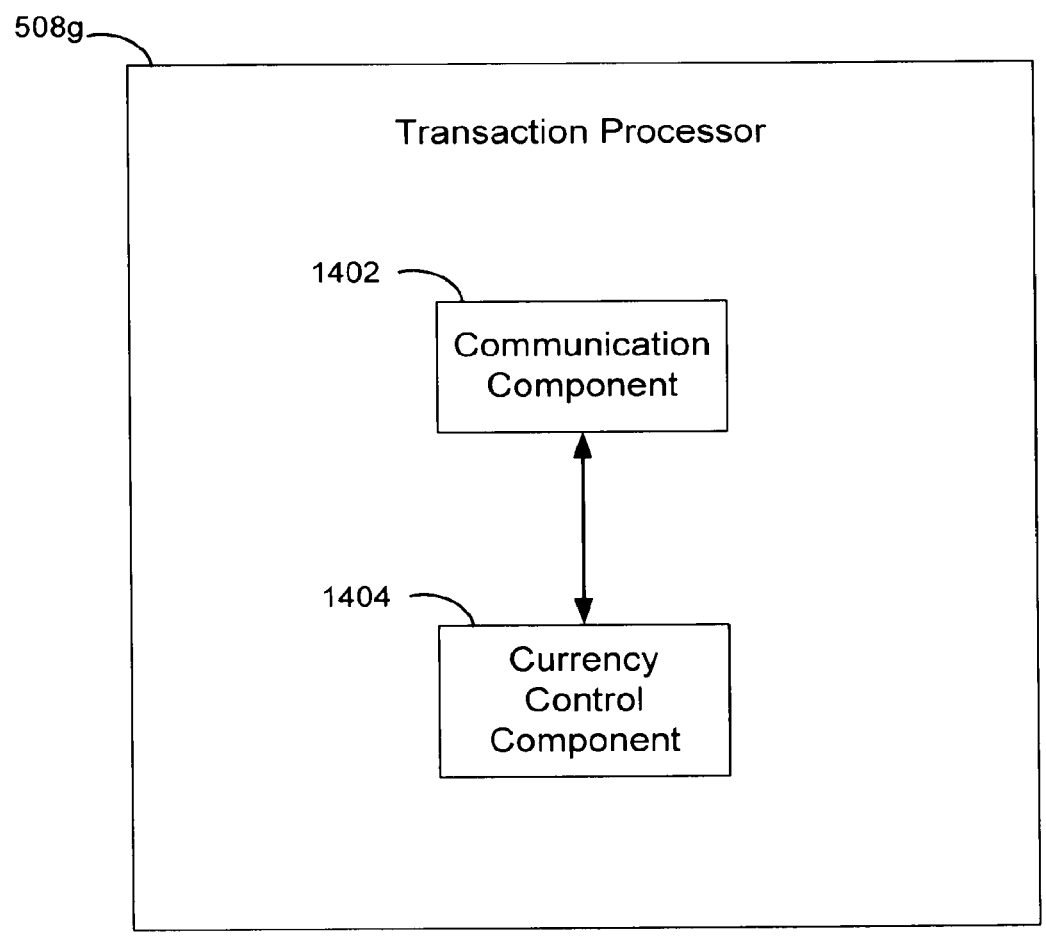
FIG. 14 is a block diagram illustrating a communication component and currency control component according to one embodiment.

The methods and systems for currency dispensation may be implemented in and/or by any suitable hardware, software, firmware, or combination thereof. Accordingly, as used herein, a component or module may comprise hardware, software, and/or firmware (e.g., self-contained hardware or software components that interact with a larger system). For example, as shown in FIG. 14, the transaction processor 508h (and/or switch 1202) may include a communication component 1402 and currency control component 1404 (in FIG. 14 reference numerals with a superscripted symbol, e.g., 508h, indicate elements similar to those of the same name as those described with respect to FIG. 5, i.e., the transaction processor 508). The communication component 1402 may include one or more data interfaces, bus interfaces, wired or wireless network adapters, or modems for transmitting and receiving data via data links 520, 526, 522, and/or 1204. In addition, the communication component 1402 may include software and/or firmware to implement one or more protocols, such as stacked protocols along with corresponding layers (e.g., application layers (e.g., HTTP), transport layers (e.g., TCP), network layers (e.g., IP), and link layers (e.g., Ethernet)).

The currency control component 1404 may include software and/or firmware that accepts connections in order to service requests by sending back responses to implement one or more of the methods described herein. In addition, the currency control component 1404 may include hardware to implement one or more of the methods described herein, such as a processor coupled to a network interface and/or storage device.

The methods and systems may exist as one or more software or firmware programs comprised of program instructions in source code, object code, executable code or other formats. A software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network. Following the teachings herein, a suitable service provider such as Smart Processing Solutions Inc. of Toronto, ON (Canada) may write the code.

Embodiments may include various steps, which may be embodied in machine-executable instructions to be executed by a general-purpose or special-purpose processor (or other electronic device). Alternatively, the steps may be performed by hardware components that include specific logic for performing the steps or by a combination of hardware, software, and/or firmware. A result or output from any step, such as a confirmation that the step has or has not been completed or an output value from the step, may be stored, displayed, printed, and/or transmitted over a wired or wireless network. For example, the authorization and/or denial may be stored, displayed, or transmitted over a network.

Embodiments may also be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

Thus as should be appreciated in view of the teachings herein, certain embodiments may be capable of achieving certain advantages, including by way of example and not limitation one or more of the following: (1) providing a cost-effective CDCS; (2) providing a CDCS that permits a commercial establishment to enjoy having both a time-release safe and an ATM but eliminates the need to purchase both machines; (3) providing a solution that maximizes use of merchant floor space; (4) providing a CDCS that deters theft; (5) providing a CDCS that reduces and/or eliminates the need to modify terminal hardware and/or software; (6) providing a CDCS that allows merchants to remit cash to winners of electronic gaming stations (e.g., video poker), remit cash to lottery winners, cash checks for customers, pay employees, and pay for COD deliveries, for example, without keeping large sums of money in a cash register; (7) providing a CDCS that decreases an establishment's attractiveness to robbers; (8) providing a CDCS that is faster and more reliable than using prior art ATM/time-release safe terminals by running at least a portion of the CDCS independent of an external EFT network; (9) providing a CDCS having a uniform code that interfaces with multiple makes and models of terminals; and (10) providing a CDCS that rewards customers for use.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method for dispensing currency stored in a terminal of a currency dispense and control system (CDCS), the CDCS including a currency control operational mode that effects dispensation of the currency in response to a merchant-initiated currency control transaction being authorized independently of an electronic fund transfer (EFT), and the CDCS including an automated teller machine (ATM) operational mode that effects dispensation of the currency in response to an EFT-based transaction being authorized by initiation of the EFT for debiting of a financial account and for crediting a merchant account, the method comprising:

receiving, at the terminal of the CDCS, a request to dispense the currency, the request including transaction information comprising a transaction amount, card data, and a personal identification number, and the transaction information indicating whether dispensation of the currency is to be effected by one of a merchant-initiated currency control transaction or an EFT-based transaction requiring authorization via an EFT network;

transmitting at least a portion of the transaction information, via a first data link, to a remote transaction processor for authorization of the request to dispense the currency, the transmitted portion of the transaction information being usable by the remote transaction processor to determine whether the request is to be fulfilled by one of:

authorizing the request to dispense the currency independently of the EFT network by bypassing the EFT network and dispensing the currency according to the transaction amount in response to the transaction information indicating the dispensation is to be effected by the merchant-initiated currency control transaction; and authorizing the request to dispense the currency by initiating debiting of a financial account according to the transaction amount in response to the transaction information indicating the dispensation is to be effected by the EFT-based transaction requiring authorization via the EFT network;

receiving from the remote transaction processor, via the first data link, authorization of the request to dispense the merchant currency from the remote transaction processor, the remote transaction processor authorizing the request to dispense the merchant currency independently of the EFT network in response to the merchant initiated currency control transaction, and the remote transaction processor authorizing the request to dispense the merchant currency by initiating debiting of the financial account in response to the EFT based transaction; and dispensing the merchant currency.

2. The method of claim 1 wherein the received authorization is delayed for a predetermined period of time.

3. The method of claim 1 wherein the terminal comprises an ATM.

4. The method of claim 1, in which the card is a bank-issued card including information to identify a party to the EFT-based transaction.

5. The method of claim 1, in which the card is a non-bank-issued card including information to identify a party to the merchant-initiated currency control transaction.

6. The method of claim 1, in which the merchant-initiated currency control transaction is authorized according to a time-release period to provide periodically accessible on-site storage of the currency stored in the terminal.

7. The method of claim 1, in which the merchant-initiated currency control transaction comprises an electronic gaming station payout, lottery payout, a customer check cashing transaction, or a collect on delivery (COD) payment.

8. A terminal of a currency dispense and control system (CDCS) for dispensing currency, the CDCS including a currency control operational mode that effects dispensation of the currency in response to a merchant-initiated currency control transaction being authorized independently of an electronic fund transfer (EFT), and the CDCS including an automated teller machine (ATM) operational mode that effects dispensation of the currency in response to an EFT-based transaction being authorized by initiation of the EFT for debiting of a financial account and for crediting a merchant account, the terminal comprising:

a card reader to accept a card from a user and to read card data carried by the card;

a bill dispenser to dispense the currency to the user;

a keypad configured to receive transaction information from the user, the transaction information including a transaction amount and a personal identification number, and the transaction information indicating whether dispensation of the currency is to be effected by one of a merchant-initiated currency control transaction or an EFT-based transaction requiring authorization via an EFT network;

a network interface device in communication with a first data link, a processor operably coupled to the card reader, the bill dispenser, the keypad, and the network interface; and a memory operably coupled to the processor, the memory storing instructions that configure the processor to:

receive a request to dispense the currency, the request including the transaction information and card data;

transmit at least a portion of the transaction information, with the network interface, via a first data link, to a remote transaction processor for authorization, the transmitted portion of the transaction information being useable by the remote transaction processor to determine whether the request is to be fulfilled by one of:

authorizing the request to dispense the currency independently of the EFT network by bypassing the EFT network and dispensing the currency according to the transaction amount in response to the transaction information indicating the dispensation is to be effected by the merchant-initiated currency control transaction; and authorizing the request to dispense the currency by initiating debiting of a financial account according to the transaction amount in response to the transaction information indicating the dispensation is to be effected by the EFT-based transaction requiring authorization via the EFT network;

receive from the remote transaction processor, via the first data link, authorization of the request to dispense the currency; and engage the bill dispenser to dispense the currency based on the received authorization of the request to dispense the currency.

9. The terminal of claim 8 wherein the received authorization is delayed for a predetermined period of time.

10. An ATM comprising the terminal of claim 8.

11. The terminal of claim 8 wherein the card comprises a magnetic stripe card, and in which the card data is encoded in a magnetic stripe on the card.

12. The terminal of claim 8, further comprising:

a printer operably coupled to the processor and configured to print receipts of currency dispensations.

13. The terminal of claim 8, in which the card is a bank-issued card including bank information to identify a party to the EFT-based transaction.

14. The terminal of claim 8, in which the card is a non-bank-issued card including information to identify a party to the merchant-initiated currency control transaction.

15. The terminal of claim 8, in which the merchant-initiated currency control transaction is authorized according to a time-release period to provide periodically accessible on-site storage of the currency stored in the terminal.

16. The terminal of claim 8, in which the merchant-initiated currency control transaction comprises an electronic gaming station payout, lottery payout, a customer check cashing transaction, or a collect on delivery (COD) payment.

* * * * *